United States Patent [19]

Hara

[11] Patent Number: 4,635,603
[45] Date of Patent: Jan. 13, 1987

[54] FUEL PRESSURE CONTROL SYSTEM FOR INTERNAL COMBUSTION ENGINE

[75] Inventor: Yoichi Hara, Hiratsuka, Japan

[73] Assignee: Nissan Motor Co., Ltd., Yokohama, Japan

[21] Appl. No.: 730,094

[22] Filed: May 3, 1985

[30] Foreign Application Priority Data

May 8, 1984 [JP] Japan .............. 59-67704[U]

[51] Int. Cl.⁴ ............................................ F02M 39/00
[52] U.S. Cl. ................................ 123/383; 123/179 L; 123/464; 123/463
[58] Field of Search ........ 123/383, 382, 447, 357–359, 123/179 L, 463, 464

[56] References Cited

U.S. PATENT DOCUMENTS

| | | | |
|---|---|---|---|
| 2,749,898 | 6/1956 | Isley | 123/383 |
| 4,404,944 | 9/1983 | Yamazaki | 123/179 L |
| 4,438,748 | 3/1984 | Ikeura | 123/179 L |
| 4,446,940 | 5/1984 | Sakakibara | 123/383 |
| 4,513,725 | 4/1985 | Minami | 123/383 |
| 4,519,355 | 5/1985 | Fujimura | 123/179 L |

FOREIGN PATENT DOCUMENTS

| | | | |
|---|---|---|---|
| 2488336 | 2/1982 | France | 123/464 |
| 0157059 | 9/1982 | Japan | 123/463 |
| 0067964 | 4/1983 | Japan | 123/464 |

Primary Examiner—Carl Stuart Miller
Attorney, Agent, or Firm—Schwartz, Jeffery, Schwaab, Mack, Blumenthal & Evans

[57] ABSTRACT

A fuel pressure control system has a fuel pressure regulator having a reference chamber and a fuel chamber separated by a diaphragm which opens and close a fuel return passage in accordance with a pressure difference between both chambers. There are provided an accumulator for containing an air pressurized by a supercharger, and a temperature sensor for sensing a temperature of the fuel. A control unit normally puts a three-way electromagnetic fuel pressure control valve in a first position to introduce an intake manifold vacuum into the reference chamber. When the temperature sensed by the temperature sensor is higher than a predetermined value, the control unit puts the valve in a second position to introduce a high pressure air in the accumulator into the reference chamber to prevent vapor lock by increasing the fuel pressure.

14 Claims, 5 Drawing Figures

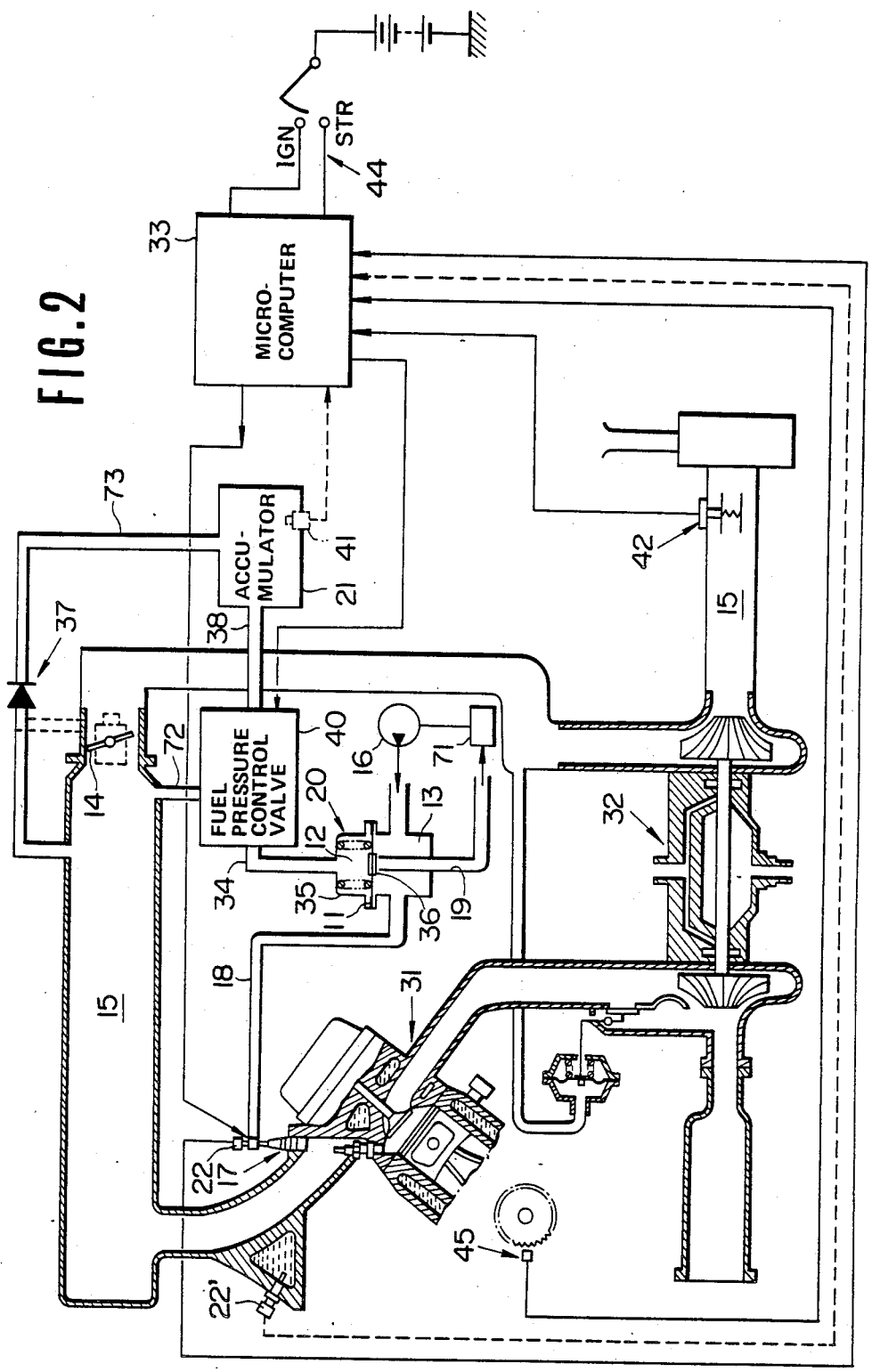

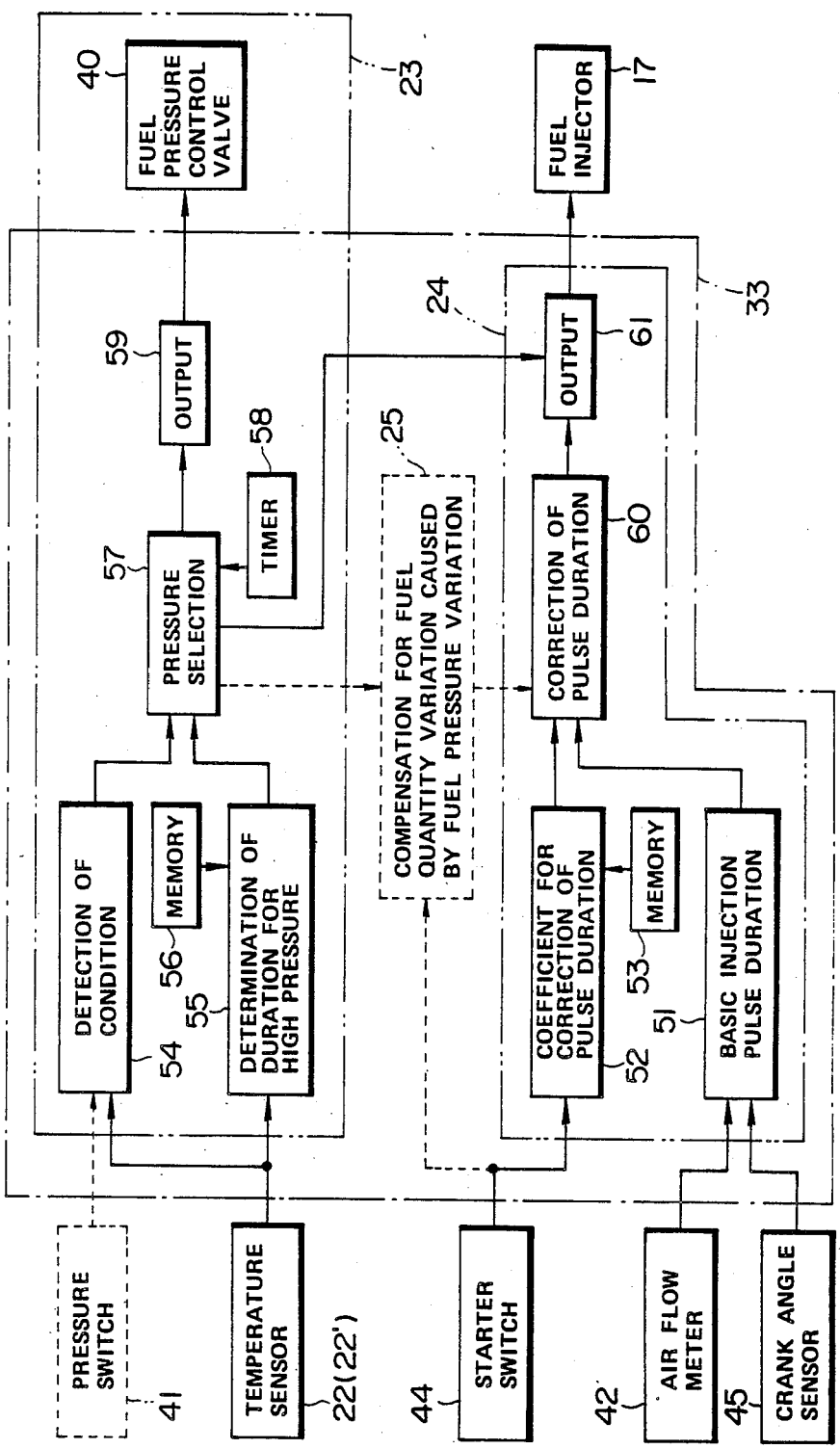

FUEL PRESSURE CONTROL SYSTEM FOR INTERNAL COMBUSTION ENGINE

BACKGROUND OF THE INVENTION

The present invention relates to a fuel pressure control system, and more specifically to a system for controlling a fuel pressure regulator.

Japanese Utility Model application, provisional publication number 55-94436 discloses one example of the conventional fuel pressure control system. As shown in FIG. 1, this system has a fuel pressure regulator 3 disposed in a fuel feed passage extending from a fuel pump 1 to a fuel injector 2. The pressure regulator 3 has a fuel chamber 5 and a reference pressure chamber 6 which are separated by a diaphragm 4. A return passage 7 for returning the fuel from the fuel chamber 5 to a fuel tank has an open end located in the fuel chamber 5. The diaphragm 4 opens and closes the return passage 7 by deflecting in accordance with the intake manifold vacuum introduced into the reference chamber 6. Thus, the fuel pressure regulator 3 can control the fuel pressure so that a pressure difference between the fuel pressure and the intake vacuum can be maintained constant (2.5 kg/cm², for example). Therefore, the fuel pressure is given by;

Fuel pressure (kg/cm²)=2.5+Reference pressure of Regulator

During idling, the reference pressure is negative, and therefore the fuel pressure is smaller than 2.5 kg/cm². When the reference pressure is equal to atmosphere pressure (the reference pressure=0), the fuel pressure is maintained equal to 2.5 kg/cm².

A control valve 9 is disposed in a reference pressure passage 8 conveying the intake manifold vacuum to the reference chamber 6. When a hot start sensor (temperature sensor) 10 detect that the fuel temperature is high, the control valve 9 introduces atmospheric pressure into the reference chamber 6 to prevent vapor lock by increasing the fuel pressure.

However, this system cannot increase the fuel pressure sufficiently to prevent vapor lock, so that there remains a possibility that vapor of fuel decrease and increase the fuel supply violently, and causes engine troubles such as difficulty in starting engine and fluctuation of engine rotational speed.

SUMMARY OF THE INVENTION

It is an object of the present invention to provide a fuel pressure control system capable of increasing fuel pressure sufficiently to prevent vapor lock.

According to the present invention, a system for controlling a fuel pressure in a fuel supply system for a fuel injection type internal combustion engine equipped with a supercharger, comprises a pressure regulator, normal reference pressure supplying means, high reference pressure supplying means, a temperature sensor, and fuel pressure control means. The pressure regulator has a diaphragm separating a reference pressure chamber and a fuel chamber which is in fluid communication with a fuel feed passage for conveying a fuel from a fuel pump to at least one fuel injector of the engine, and a fuel return port for draining the fuel from the fuel chamber. The diaphragm is capable of opening and closing the fuel return port in accordance with a pressure difference between both chambers. The normal reference pressure supplying means is for introducing an air pressure in an intake air passage of the engine at a position downstream of a throttle valve into the reference pressure chamber. The high reference pressure applying means is for containing an air pressurized by the supercharger. The temperature sensor is for sensing a temperature of the fuel in the fuel supply system. The fuel pressure control means is for supplying the air pressure of the high reference pressure supplying means to the reference pressure chamber when the temperature sensed by the temperature sensor is equal to or higher than a predetermined value.

BRIEF DESCRIPTION OF THE DRAWINGS

FIG. 2 is a schematic view showing a fuel pressure control system of one embodiment according to the present invention, FIG. 3 is a block diagram of the control system of FIG. 2.

DETAILED DESCRIPTION OF THE INVENTION

Figure 4:
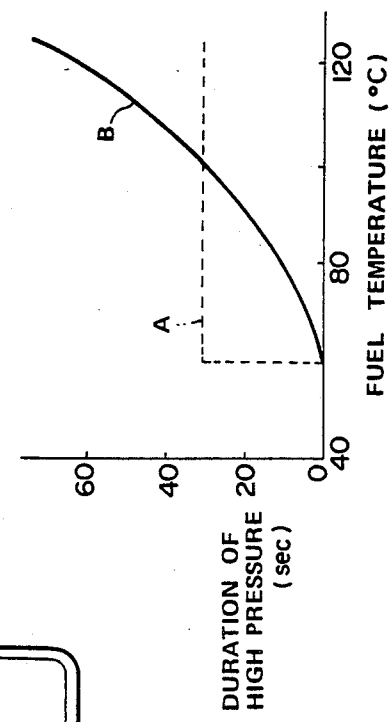
FIG. 4 is a graph showing a relationship between a fuel temperature and a time duration for which a fuel pressure is maintained at a high level.

FIGS. 2 to 4 show one embodiment in which the present invention is applied to an internal combustion having a supercharger.

As shown in FIG. 2, the engine has a main body 31, which is connected with a supercharger 32 through an intake passage 15. The supercharger 32 of this embodiment is a turbocharger. The engine has at least one fuel injector 17 disposed in the intake passage 15 near an intake port. The injector 17 is controlled by a fuel injection quantity control means 24, which is incorporated in a control unit 33. In this embodiment, the control unit 33 is a microcomputer. A fuel feed passage 18 supplies a fuel from a fuel pump 16 to the injector 17.

A fuel pressure regulator 20 is provided for maintaining a pressure difference between a pressure in the intake passage 15 and a pressure of the fuel supplied to the injector 17 constant. The pressure regulator 20 has a diaphragm 11 which divides an inner space of the regulator 20 into a reference pressure chamber 12 and a fuel chamber 13. The fuel chamber 13 is in fluid communication with the fuel feed passage 18. A fuel return passage 19 extends into the fuel chamber 13 and has an end opening in the fuel chamber 13. The reference pressure chamber 12 is normally in fluid communication with a portion of the intake passage 15 located downstream of a throttle valve 14 for controlling an intake air flow of the engine, through a reference pressure passage 34 and a normal pressure passage 72. A spring 35 is disposed under compression in the reference pressure chamber 12. The spring 35 applies a predetermined biasing force on the diaphragm 11 toward the open end of the fuel return passage 19. A valve member 36 is fixed to the diaphragm 11 so that the valve member 36 can open and close the open end of the fuel return passage 19 in accordance with movement of the diaphragm 11. The diaphragm 11 deflects in accordance with fluid pressure variation in the reference pressure chamber 12. Thus, the pressure regulator 20 maintains a pressure difference between a fuel pressure in the fuel feed passage 18 and an air pressure in the intake passage 15 at a constant value which is equal to 2.5 kg/cm², for example.

There is further provided a high reference pressure supplying means which comprises a pressure accumulator 21 for containing pressurized air. The accumulator 21 stores a supercharging pressure which is introduced thereinto through a supercharging pressure supply passage 73. A check valve 37 is disposed in the supercharging pressure supply passage 73. A downstream end of the supercharging pressure passage 73 opens into the intake passage 15 at a portion downstream of the throttle valve 14 as shown by a solid line in FIG. 2 or alternatively at a portion upstream of the throttle valve 14 as shown by a broken line in FIG. 2. Therefore, the accumulator 21 stores the supercharging pressure taken on the downstream or upstream side of the throttle valve 14. It is more advantageous to use the supercharging pressure taken on the upstream side of the throttle valve 14 than to use the supercharging pressure taken on the downstream side because the supercharging pressure on the upstream side is higher than the supercharging pressure on the downstream side when the throttle valve 14 is not in a fully open state. Thus, the accumulator 21 sotres a high pressure air compressed by the turbocharger 32.

The accumulator 21 is connected through a high pressure passage 38 to a fuel pressure control three-way electromagnetic valve 40 which is disposed between the normal pressure passage 72 and the reference pressure passage 34. In accordance with a signal of the control unit 33, the valve 40 alternatively connects the normal pressure passage 72 or the high pressure passage 38 to the reference pressure passage 34 so that the reference pressure chamber 12 of the regulator 20 is altnernatively supplied with the air pressure in the intake passage 15 on the downstream side of the throttle valve 14 or the air pressure in the accumulator 21.

It is optional to provide a pressure switch 41 which detects the air pressure in the accumulator 21 and sends an output signal to the control unit 33.

There is provided a fuel temperature sensor 22 which is disposed in the fuel feed passage 18 near the injector 17 for sensing a temperature of the fuel. It is optional to use a coolant temperature sensor 22' in place of the fuel temperature sensor 22. In this case, the coolant temperature sensor 22' senses a temperature of a cooling water of the engine to sense the fuel temperature indirectly. An output signal of the fuel temperature sensor 22 or the coolant temperature sensor 22' is inputted to the control unit 33.

An air flow meter 42 is disposed in the intake passage 15 on the upstream side of the turbocharger 32. An output signal of the air flow meter 42 is inputted to the control unit 33. In the system of FIG. 2, there are further provided a starter switch 44 which is in an on state during a cranking operation of the engine, and a crank angle sensor 45. The fuel injection quantity control means 24 of the control unit 33 determines a fuel injection quantity in accordance with input data. That is, the means 24 determines a pulse duration (or pulse width) of a fuel injection pulse signal for which the injector 17 is to be held in an open state.

It is optional to provide a compensation means 25 in the control unit 33. When the high pressure in the accumulator 21 is introduced into the reference pressure chamber 12 by the fuel pressure control valve 40, the compensation means 25 decreases the pulse duration of the fuel injection pulse signal so as to maintain the fuel injection quantity constant irrespectively of the fuel pressure change.

As shown in FIG. 3, the control unit 33 comprises a means 51 for determining a basic fuel injection pulse duration Tp in accordance with the output signals of the air flow meter 42 and crank angle sensor 45. For example, $Tp = K \cdot Qa/N$ where Qa is an air flow rate, N is an engine rpm, and K is a coefficient. The control unit 33 further comprises a means 52 for determining one or more coefficients of pulse duration correction. In accordance with various input data, such as the output signals of the starter switch 44, and the coolant temperature sensor 22', the correction coefficient determining means 52 reads one or more coefficients for correcting the basic pulse duration Tp, from a memory 53. For example, the means 52 determines a coefficient Ktw of correction based on the coolant water temperature, a coefficient Kas of correction during cranking operation of the engine, a coefficient Kacc of correction during acceleration, a coefficient $\alpha$ of correction for a feedback air fuel ratio control, and a coefficient Ts of voltage correction. The control unit 33 further comprises a means 54 for determining whether an increase of the fuel pressure is required or not, in accordance with the output signal of the temperature sensor 22 or 22'. The means 54 may be arranged further to receive the output signal of the pressure switch 41. The control unit 33 further comprises a means 55 for determining a time duration for which the fuel pressure is to be held at a high level. This time duration may be constant (for example, 30 seconds) as shown by a broken line A in FIG. 4, or may be a function of the fuel temperature in which the time duration increases with increase of the fuel temperature, as shown by a solid line B in FIG. 4. In the latter case, the means 55 reads the duration from a memory 56 in accordance with the output signal of the temperature sensor 22. The control unit 33 further comprises a means 57 for controlling the fuel pressure control valve 40 to select one of the normal pressure passage 72 and the high pressure passage 38. The means 57 is connected with a timer 58 for measuring the time duration determined by the means 55. The control unit 33 further comprises a means for outputting a control signal to the fuel pressure control valve 40 in accordance with the output signal of the means 57. The control unit 33 may further comprises the compensation means 25 for compensating for a fuel injection quantity variation caused by an increase of the fuel pressure. The means 25 determines a compensation coefficient used for modifying the pulse duration of the fuel injection pulse signal while the fuel pressure is increased. For example, the means 25 sets the compensation coefficient equal to 0.91 while the starter switch 44 is in its on state during cranking operation of the engine, and to 0.83 while the starter switch 44 is in its off state during normal engine operation other than cranking,. The control unit 33 further comprises a means 60 for modifying the basic injection pulse duration determined by the means 51 in accordance with the correction coefficients determined by the means 52 and the compensation coefficient determined by the means 25, and a means 61 for outputting the fuel injection pulse signal to the injector 17. In this embodiment, the microcomputer is arranged to perform the functions of these means of the control unit 33.

Figure 5:
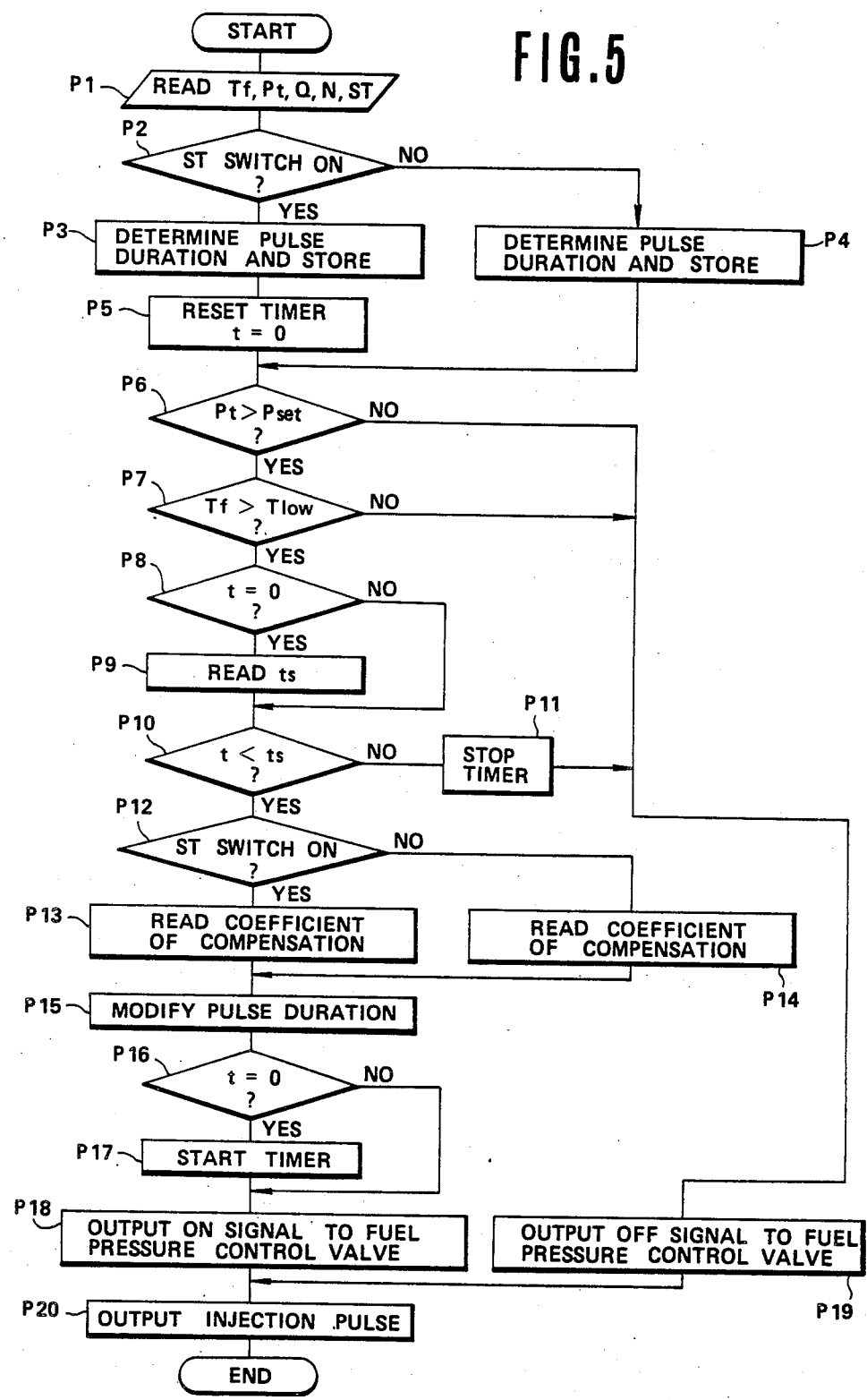
FIG. 5 is a flow chart showing a control program used in the embodiment of the present invention.

FIG. 5 shows a control program performed by the control unit 33 when the control unit 33 is a microcomputer. This program is executed every revolution of the engine, for example.

At a step p1, a central processing unit (CPU) of the microcomputer 33 reads fuel temperature Tf, pressure Pt in the accumulator 21, intake air quantity Q of the engine, engine rpm N, and signal ST of the starter switch 44. At a step p2, the CPU determines whether the starter switch 44 is on or not, that is, whether the engine is under cranking operation or not. If the starter switch 44 is in the on state, the CPU determines the fuel injection pulse duration during cranking, and stores the result in a memory at a step p3, and then resets a counter of the timer 58 to zero (t=0) at a step p5. If the engine is not under cranking but in the normal operating state such as idling, the CPU determines the fuel injection pulse during for the normal operation, and stores the result in the memory at a step p4. Then, the CPU proceeds to a step p6, and determines whether the pressure in the accumulator 21 is high enough (Pt>a predetermined value Pset), at a step p6. If the pressure is not high enough, the CPU proceeds to a step p19, and outputs an off signal to command the fuel pressure control valve 40 to prevent the high pressure in the accumulator 21 from flowing into the reference pressure chamber 12 of the pressure regulator 20. If the pressure is high enough, the CPU proceeds to a step p7, and determines whether an increase of the fuel pressure is required or not, by comparing the fuel temperature Tf with a predetermined reference value Tlow (For example, Tlow=60° C.). If the fuel temperature Tf is higher than Tlow, the CPU determines whether the counter of the timer 58 indicates zero (t=0) or not, at a step p8. If the fuel temperature Tf is not higher than Tlow, and therefore there is no fear of vapor lock, then the CPU proceeds to the step p19 and outputs the off signal to the fuel pressure control valve 4, so that the manifold pressure is introduced into the reference pressure chamber 12. If the CPU determines that the counter of the timer 58 is in a reset state (t=0) at the step p8, then the CPU proceeds to a step p9 and reads a time duration ts for which the fuel pressure is maintained at a high level, from the memory. The duration ts may be a constant value (30 seconds, for example), or may be a function of the fuel temperature Tf as shown in FIG. 4. After the step p9, the CPU proceeds to a step p10. If the counter is not in the reset state t≠0), the CPU proceeds directly from the step p8 to the step p10. Therefore, if t≠0, the CPU does not change the value of the duration ts but maintains the initially-read value even if the fuel temperature varies. At the step p10, the CPU determines whether the fuel pressure has been maintained at the high level for the preset duration ts, by comparing the count t with the preset duration ts. If it has been, that is, t is equal to or greater than ts, then the CPU stops the timer 58 at a step p11, and proceeds to the step p19. If t is smaller than ts, the CPU determines whether the engine is under cranking operation, again at a step p12. If it is, the CPU reads the coefficient (0.91, for example) of compensation for cranking period at a step p13. If it is not, the CPU reads the coefficient (0.83, for example) of compensation for normal operation period at a step p14. At a step p15, the CPU modifies the fuel injection pulse duration determined at the step p3 or p4 by multiplying the pulse duration by the coefficient of compensation determined at the step p13 or p14 in order to prevent an air-fuel mixture supplied to the engine from being made too rich by the increase of the fuel pressure. The reason for using the different values as the coefficient of compensation at the steps p13 and p14 is that the manifold pressure during cranking period (approximately equal to atmospheric pressue) is not equal to the manifold pressure during the normal operation (approximately −500 mm.Hg during idling). However, it is optional to use only one value of the coefficient of compensation which is intermediate between the value for cranking period and the value of the normal operation period. It is optional to remove the steps p12 to p15 from the program of FIG. 5 and perform the fuel pressure control without the fuel quantity compensation in order to simplify the control.

Figure 1:
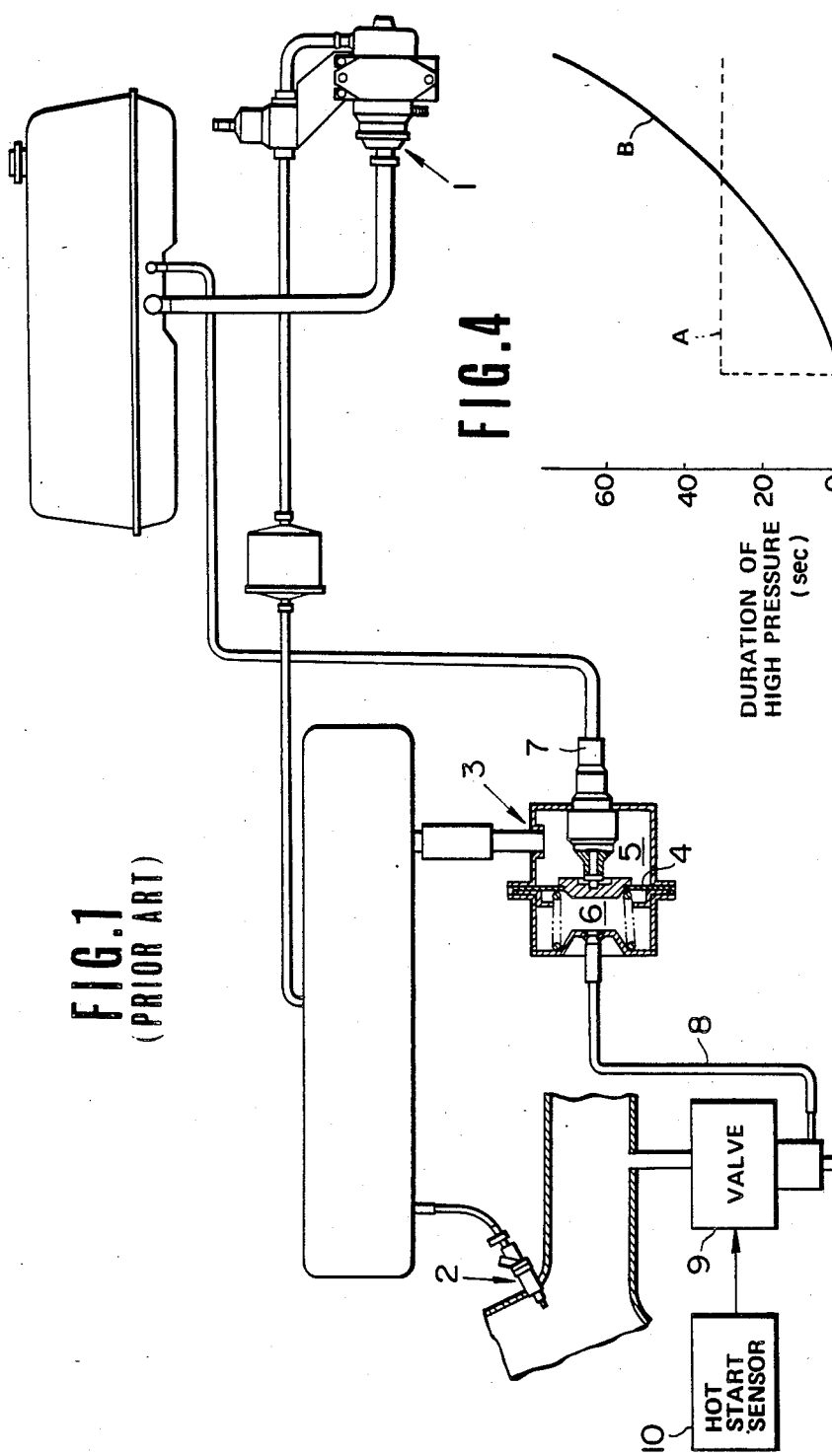
FIG. 1 is a schematic view of a conventional type fuel pressure control system.

After the step p15, the CPU proceeds to a step p16 and determines whether the timer is in the reset state (t=0) or not. If t=0, the CPU proceeds to a step p17, and starts a time interval measurement by causing the counter of the timer 58 to start counting. Then, at a step p18, the CPU outputs an on signal to the fuel pressure control valve 40. In response to the on signal of the microcomputer 33, the valve 40 introduces the high pressure in the accumulator 21 into the reference pressure chamber 12 of the pressure regulator 20. Therefore, the fuel pressure is increased to a value which is higher than the high pressure in the accumulator 21 by a predetermined pressure difference (2.5 kg/cm$^2$, for example). In the conventional fuel pressure control system shown in FIG. 1, the reference pressure can be increased only to atmospheric pressure, and therefore the fuel pressure cannot be increased beyond 2.5 kg/cm$^2$. In contrast to this, the fuel pressure control system of the present invention can increase the fuel pressure to 3.2 kg/cm$^2$, provided that the pressure in the accumulator 21 is +0.7 kg/cm$^2$. At a step p20, the CPU outputs the injection pulse having the finally determined pulse duration, to the injector 17.

What is claimed is:

1. A system for controlling fuel pressure in a fuel supply system for a fuel injection type internal combustion engine equipped with a supercharger, comprising:
   a pressure regulator having a diaphragm separating a reference pressure chamber and a fuel chamber which is in fluid communication with a fuel feed passage for conveying fuel from a fuel pump to at least one fuel injector of the engine, and a fuel return port for draining the fuel from said fuel chamber, said diaphragm being capable of opening and closing said fuel return port in accordance with a pressure difference between both chambers,
   normal reference pressure supplying means for introducing an air pressure in an intake air passage of the engine at a position downstream of a throttle valve of the engine in said reference pressure chamber,
   high reference pressure supplying means for containing an air pressurized by the supercharger,
   a temperature sensor for sensing a temperature of the fuel in the fuel supply system, and
   fuel pressure control means for supplying the air pressure of said high reference pressure supplying means to said reference pressure chamber when the temperature sensed by said temperature sensor is equal to or higher than a predetermined value,
   wherein said high reference pressure supplying means comprises an accumulator for containing the air pressurized by the supercharger, and said fuel pressure control means comprises a three-way valve having a first position for supplying the pressure from said normal reference pressure supplying means to said reference pressure chamber and a second position for supplying the pressure from said high reference pressure supplying means to said reference pressure chamber, and a control unit producing a control signal to control said valve in accordance with the temperature sensed by said temperature sensor.

2. A system according to claim 1, wherein said high reference pressure supplying means comprises a supercharging pressure supply passage extending from an upstream end connected to the intake passage at a position downstream of the supercharger to a downstream end connected to said accumulator, for conveying the air pressurized by the supercharger to said accumulator, and a check valve disposed in said supercharging pressure supply passage for permitting the air flow toward said accumulator but preventing a return flow.

3. A system according to claim 2, wherein the upstream end of said supply passage of said high reference pressure supplying means is connected to the intake air passage at a position downstream of the throttle valve.

4. A system according to claim 2, wherein the upstream end of said supply passage of said high reference pressure supplying means is connected to the intake air passage at a position upstream of the throttle valve.

5. A system according to claim 2, wherein the supercharger is a turbocharger.

6. A system according to claim 2, wherein said temperature sensor is disposed in said fuel feed passage.

7. A system according to claim 2, wherein said temperature sensor is disposed in a coolant passage of the engine for sensing the fuel temperature indirectly by sensing the temperature of the coolant of the engine.

8. A system according to claim 2, further comprising a starter switch which is in an on state during cranking of the engine and in an off state when the engine is out of cranking operation, and wherein, if said valve continues in said second position and simultaneously said starter switch continues in said off state for a predetermined time duration, said control unit changes said valve from said second state to said first state at an end of said predetermined time duration.

9. A system according to claim 8, wherein said predetermined time duration is constant.

10. A system according to claim 8, wherein said predetermined time duration increases as the fuel temperature increases.

11. A system according to claim 2, further comprising a pressure switch for sensing a pressure in said accumulator, and wherein said control unit holds said valve in said first position when the pressure sensed by said pressure switch is lower than a predetermined pressure.

12. A system according to claim 2, further comprising means for compensating for a fuel injection quantity variation caused by a fuel pressure variation so that the fuel injection quantity is maintained constant irrespectively of whether said valve is in said first or second position.

13. A system according to claim 12, wherein said compensating means decreases a pulse duration of a fuel injection pulse signal to control the fuel injector, by multiplying the pulse duration by a coefficient of compensation which is smaller than one.

14. A system according to claim 13, further comprising a starter switch which is in an on state during cranking operation of the engine, and in an off state when the engine is out of cranking operation, and wherein said compensating means sets the coefficient of compensation equal to a first value when said starter switch is in the on state and to a second value smaller than said first value when said starter switch is in the off state.

* * * * *